(12) United States Patent
Mirho

(10) Patent No.: US 11,625,871 B2
(45) Date of Patent: *Apr. 11, 2023

(54) SYSTEM AND METHOD FOR CAPTURING AND INTERPRETING IMAGES INTO TRIPLE DIAGRAMS

(71) Applicant: Rowan TELS Corp., Seattle, WA (US)

(72) Inventor: Charles Mirho, Vancouver, WA (US)

(73) Assignee: Rowan TELS Corp., Seattle, WA (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/147,332

(22) Filed: Jan. 12, 2021

(65) Prior Publication Data

US 2021/0133437 A1 May 6, 2021

Related U.S. Application Data

(63) Continuation of application No. 16/170,563, filed on Oct. 25, 2018, now Pat. No. 10,909,358, which is a continuation of application No. 14/731,225, filed on Jun. 4, 2015, now abandoned.

(51) Int. Cl.
*G06K 9/00* (2022.01)
*G06T 11/20* (2006.01)
*G06T 5/00* (2006.01)
*G06V 10/50* (2022.01)
(Continued)

(52) U.S. Cl.
CPC ............ *G06T 11/206* (2013.01); *G06T 5/002* (2013.01); *G06V 10/50* (2022.01); *G06V 30/413* (2022.01); *G06T 1/0007* (2013.01); *G06T 2207/10004* (2013.01); *G06T 2207/10016* (2013.01)

(58) Field of Classification Search
None
See application file for complete search history.

(56) References Cited

U.S. PATENT DOCUMENTS 5,517,578 A * 5/1996 Altman ............... G06F 3/04883
382/199
5,729,637 A 3/1998 Nicholson et al.
(Continued)

OTHER PUBLICATIONS

Kasturi et al., "A system for interpretation of line drawings," in IEEE Transactions on Pattern Analysis and Machine Intelligence, vol. 12, No. 10, pp. 978-992, Oct. 1990, doi: 10.1109/34.58870. (Year: 1990).*

(Continued)

*Primary Examiner* — Feng Niu
(74) *Attorney, Agent, or Firm* — Rowan TELS LLC

(57) ABSTRACT

A diagram generator comprises a line characterizer, a label characterizer, a block diagrammer to transform the set of drawing objects into a block diagram, a flow charter to transform the set of drawing objects into a flow chart, and a data flow diagrammer to transform the set of drawing objects into a data flow diagram. A client device receives a raw image signal of a print or display graph from a camera and in response processes the raw image to reduce noise, normalize the raw image data, and reduce pixel information. A server system receives the processed image from the client device and in response operates diagram generator logic to transform the processed image into a format in which image lines and other geometric objects are manipulable.

13 Claims, 14 Drawing Sheets

(51) Int. Cl.
*G06V 30/413* (2022.01)
*G06T 1/00* (2006.01)

(56) References Cited

U.S. PATENT DOCUMENTS

| | | | | |
|---|---|---|---|---|
| 5,825,944 | A * | 10/1998 | Wang | G06T 11/60 382/226 |
| 6,081,620 | A | 6/2000 | Anderholm | |
| 6,233,353 | B1 * | 5/2001 | Danisewicz | G06V 30/414 382/176 |
| 6,385,350 | B1 | 5/2002 | Nicholson et al. | |
| 6,411,733 | B1 * | 6/2002 | Saund | G06V 30/413 382/257 |
| 6,415,097 | B1 | 7/2002 | Takei et al. | |
| 7,136,082 | B2 | 11/2006 | Saund et al. | |
| 7,139,004 | B2 | 11/2006 | Saund et al. | |
| 7,283,670 | B2 * | 10/2007 | Wakeam | G06V 30/1423 382/186 |
| 7,394,935 | B2 * | 7/2008 | Chen | G06F 3/0488 715/255 |
| 7,412,094 | B2 * | 8/2008 | Chen | G06F 40/171 715/255 |
| 7,468,801 | B2 * | 12/2008 | Wakeam | G06F 40/171 358/1.14 |
| 7,503,015 | B2 * | 3/2009 | Chen | G06F 3/0488 715/268 |
| 7,533,338 | B2 * | 5/2009 | Duncan | G06F 40/169 715/268 |
| 7,576,753 | B2 * | 8/2009 | Saund | G06V 30/414 715/272 |
| 7,725,493 | B2 * | 5/2010 | Saund | G06F 16/9027 707/713 |
| 7,729,538 | B2 * | 6/2010 | Shilman | G06V 10/446 382/187 |
| 7,800,613 | B2 * | 9/2010 | Hanrahan | G06T 11/206 345/440 |
| 7,904,810 | B2 * | 3/2011 | Chen | G06F 3/0488 715/256 |
| 7,907,141 | B2 * | 3/2011 | Saund | G06V 30/414 345/468 |
| 7,953,441 | B2 | 5/2011 | Lors | |
| 8,014,607 | B2 * | 9/2011 | Saund | G06V 30/1423 382/187 |
| 8,099,674 | B2 * | 1/2012 | Mackinlay | G06F 3/04817 715/764 |
| 8,406,477 | B2 * | 3/2013 | Chen | G06T 19/00 382/113 |
| 8,875,016 | B2 * | 10/2014 | Saund | G06V 30/333 715/256 |
| 10,049,476 | B1 | 8/2018 | Broadus et al. | |
| 2006/0045337 | A1 * | 3/2006 | Shilman | G06V 30/153 382/181 |
| 2006/0206512 | A1 * | 9/2006 | Hanrahan | G06T 11/206 707/999.102 |
| 2007/0061611 | A1 * | 3/2007 | Mackinlay | G06F 3/04817 714/5.1 |
| 2007/0065013 | A1 | 3/2007 | Saund et al. | |
| 2008/0137958 | A1 | 6/2008 | Wang et al. | |
| 2008/0182620 | A1 | 7/2008 | Lors | |
| 2010/0153150 | A1 | 6/2010 | Prigge et al. | |
| 2012/0039503 | A1 | 2/2012 | Chen et al. | |
| 2012/0213429 | A1 * | 8/2012 | Vasudevan | G06V 30/422 382/176 |
| 2018/0101724 | A1 | 4/2018 | Fingado | |
| 2019/0102615 | A1 | 4/2019 | Mirho | |

OTHER PUBLICATIONS

Vasudevan et al., "Flowchart knowledge extraction on image processing," 2008 IEEE International Joint Conference on Neural Networks (IEEE World Congress on Computational Intelligence), 2008, pp. 4075-4082, doi: 10.1109/IJCNN.2008.4634384. (Year: 2008).*

Mörzinger et al., "Visual Structure Analysis of Flow Charts in Patent Images." In CLEF (Online Working Notes/Labs/Workshop), pp. 629-633. 2012. (Year: 2012).*

Karima et al., "From Paper Drawings to Computer-Aided Design," in IEEE Computer Graphics and Applications, vol. 5, No. 2, pp. 27-39, Feb. 1985, doi: 10.1109/MCG.1985.276400. (Year: 1985).*

A sketch on Sketch-Based Interfaces and Modeling Cruz.

Magic Canvas: Interactive Design of a 3-D Scene Prototype from Freehand Sketches Shin.

* cited by examiner

SYSTEM AND METHOD FOR CAPTURING AND INTERPRETING IMAGES INTO TRIPLE DIAGRAMS

CROSS-REFERENCE TO RELATED APPLICATIONS

This application is a continuation of U.S. application Ser. No. 16/170,563, filed on Oct. 25, 2018, which is a continuation of and claims priority and benefit of U.S. application Ser. No. 14/731,225, filed on Jun. 4, 2015, each of which is incorporated by reference herein in its entirety.

BACKGROUND

Individuals frequently record their thinking in a visual way, in the form of drawings and sketches on a whiteboard or piece of paper, frequently in a group setting. Such recordings are captured in a static format, and difficult to memorialize in a way that can be easily manipulated to add new formatting, record a new thought, correct misinterpretations, or evolve over time.

Current digital conversion of previously composed, static images including printed, scanned, hand drawn or non-digitally rendered images provides copies of the images in formats such as bitmap, JPEG, TIFF, PNG, GIFF, RAW, WEBP and other formats. These images are resolution dependent, preventing the scaling of the images without loss of quality. Vector formats such as CGM, Gerber, SVG, Adobe Illustrator and the like contain a geometric description which can be rendered smoothly at any desired scale; however, even these images must be rasterized to be displayed on digital monitors. Errors in the digital images cannot be easily corrected, and when scaled, become more apparent.

Along with scaling issues, the content of the reproduced image cannot be easily changed or manipulated. Layers may be applied over the digitized image, but there are limits as to how much can be accomplished. For example, if a page is scanned in at a slight angle, it is difficult, if not impossible, to right the image until it is square on the screen. If material is added to the image, or parts of the image are rearranged, it is difficult to have clean breaks, smooth edges, or match font sizes and colors. There is limited compatibility between drawing programs so that frequently the only way to correct or alter an image such as a diagram is to rewrite it completely. There is therefore a need for a means to read static image formats and convert them into editable images.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
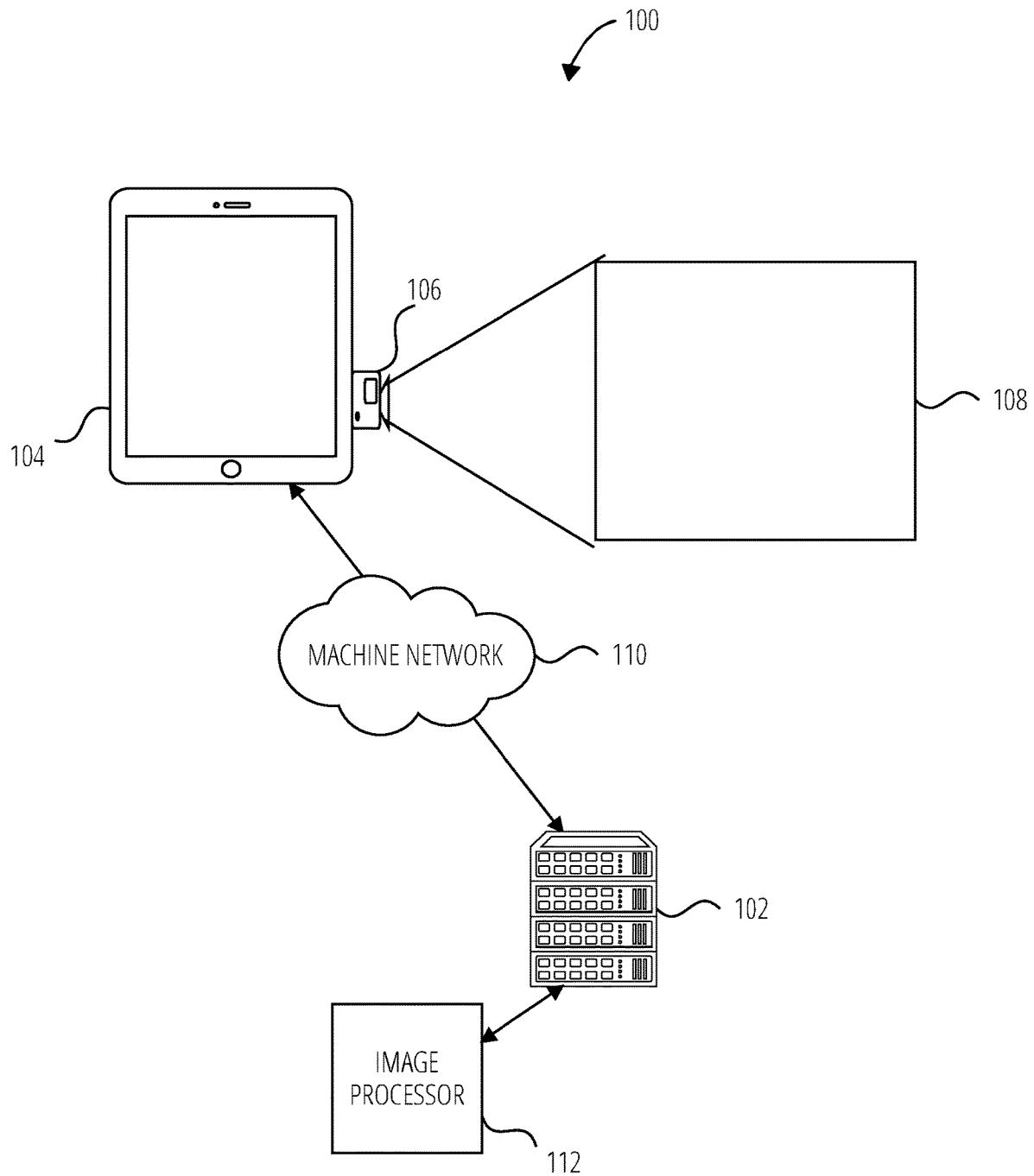
FIG. 1 illustrates an embodiment of a high level system for raw image acquisition and processing 100.

A computerized drawing tool includes logic and components capture and convert a whiteboard/paper/electronic drawing into object definitions. The tool includes logic to recognize annotations on the drawings and to interpret the annotations into specifically identified signals between physical components, including the timing of those signals, and including concurrency if present. The tool includes logic to generate a system diagram, an action flow diagram, and at least part of a flow chart based on the identified objects, lines, and annotations in the captured image. The tool may further comprise logic to identify transformations as specified by a reference to the component which could be an arrow or a line to the component and a label which the label describes the transformation explicitly or by a code or symbol. Based on the objects (shapes), lines, and annotations on the drawing, the system can produce a "triple" set of illustrations: a system diagram showing components and their inter-signaling, an action diagram showing the timing of signals in the system, and a flow chart illustrating cause and effect. The system may recognize annotations representing conditions on signals between components, or conditions on transformations carried out within components and caused by signals.

In one embodiment, the system identifies proximity of text to lines that begin and end inside or proximate to shapes. The lines are interpreted as signals between components (the shapes). The names of the shapes are identified from text enclosed by or partially enclosed by the shapes. The signal names are identified from the text proximate to the connecting lines. The timing of the signals is identified from numbers proximate to the lines, or to the text proximate to the lines. Concurrent signals have the same number. Transformations (actions carried out in response to received signals by components) are identified, for example, by text proximate to the end of lines that don't end near another component (e.g., "stem" lines) but which do end in or near a component on the other end.

A method of creating an editable image and editable text from a hand-drawn or other static two-dimensional diagram may include receiving a raw image from an image acquisition device; modifying the raw image to a modified image to reduce noise, normalize raw image data, and reduce pixels;

recognizing horizontal, vertical, and diagonal lines in the modified image using a line recognizer; connecting the lines in the modified image to form connected lines using a connector that detects and joins proximally positioned terminal ends of the lines in the modified image; recognizing areas bounded by the connected lines as bounded objects using a bounded object recognizer; and/or identifying and classifying the bounded objects using an object identifier.

Modifying the raw image may include reducing the pixels by reducing pixel information to a single channel to form a reduced raw image, generating a copy of the raw image and applying a smoothing filter to the copy of the raw image to produce a filtered copy of the raw image, and/or subtracting the filtered copy of the raw image from the reduced raw image to remove a raw image background resulting in pixel sets identifiable as linear segments.

Modifying the raw image may include determining a starting threshold based on an intensity gradient of the raw image, adjusting the starting threshold to minimize a number of isolated pixels in the raw image, performing a threshold operation to further reduce the pixels, and/or performing dilation/erosion operations to adjust a thickness of identifiable linear segments.

Recognizing the lines in the modified image using the line recognizer may include scanning the modified image signal and identifying a starting pixel based on a particular pixel value; locating an ending pixel connected to the starting pixel by a linear path of pixels equal to a value of the starting pixel; recognizing the linear path of pixels as a line segment; and/or identifying, locating, and recognizing additional starting pixels. Recognizing the lines in the modified image using the line recognizer may include identifying the ending pixel as a new starting pixel.

Recognizing areas bounded by the connected lines as the bounded objects through the bounded object recognizer may include identifying a first intersection of two lines within a bounding object as a first vertex, identifying a second intersection of two lines within the bounding object as a second vertex, calculating an average line length for the lines in the modified image based on a distance between the first vertex and the second vertex, and/or identifying lines that do not form the bounding object as strings.

An editable image and editable text may be generated by transforming a hand-drawn or other static two-dimensional diagram. A hand-drawn or other static raw image is captured using a device for recording visual images such as a camera, phone, video recorder, scanner, audio recording device, other such device, or a combination thereof. In some embodiments, the images may be recordings with the help of an accelerometer, gyroscope, or other means for combining motion data with an alignment algorithm. Images may be input from panoramic or standard frame images. In some embodiments, devices may capture multiple frames of the same object, information from which can be aggregated to produce the best manipulable digital raw image. In further embodiments, images may be resident on a computer or have been rendered by a computer or computer program.

As individuals frequently doodle or create multiple images on a single piece of paper or white board, users can select whether all or part of the captured raw image should be converted. In some embodiments, the application may zoom in on a particular aspect of a drawing or other raw image for clarification. In other embodiments, the raw image capturing device may show a preview of a raw image to a user so that the user can adjust the input to capture the most accurate raw image for processing. In further embodiments, the raw image may be captured by uploading a previously created raw image from persistent storage and processed as described below.

The captured raw image is then processed to identify each object in the raw image and determine what each object represents. The objects are then recreated in digital format and superimposed in a layer over the captured raw image so that the user can correct or edit the objects to represent the desired information or achieve the desired effect. The opacity of the recreated raw image may be increased or decreased to make the original raw image more or less visible under the recreated raw image. This allows a user to easily compare the original static raw image to the re-created raw image.

Object identification and recreation may be accomplished by processing the captured raw image to reduce noise, normalize the raw image data, and reduce pixel information using edge detection algorithms. Noise reduction may occur by any means generally used. In some embodiments, noise reduction occurs by the application of one or more filters such as a Gaussian filter, bilateral filter and/or guided filter. Such filters may be applied alone, or in combination in any order.

Once the noise in the raw image is reduced as much as possible, the intensity gradient of the raw image is located using one or more operators including the Sobel operator, Prewitt operator, and Robert Cross Operator. Such operators may be applied alone, or in combination in any order. The application of these operators allows for the isolation of horizontal, vertical and diagonal lines in the captured raw image.

Once the raw image gradients are determined, a search is carried out to determine if the gradient magnitude assumes a local maximum in the gradient direction. Non-Maximum suppression is then applied to remove unwanted pixels and help thin edges. Pixels that belong to an edge are then identified using thresholding hysteresis. Using thresholding hysteresis, two thresholds are determined, high and low. A high threshold is initially applied marking the edges that are more likely to be certain. The Object recognizer (904) assumes that important edges are along continuous curves, allowing the capturing of faint sections of lines while discarding background pixels that do not constitute a line. Starting from these and using directional information, edges are traced through the raw image and a lower threshold is then applied, allowing faint sections of edges to be added to the re-created raw image.

In some embodiments, once edge detection is completed, the raw image may be further refined using a Hough transform to identify shapes and lines. The Hough transform may be further refined using gradient direction to reduce the number of votes in a parameter space using kernel-based Hough transform and Hough transform of curves.

Once the captured raw image is processed and the objects in the raw image are defined, shape recognition is applied. Shape recognition may be applied by any means generally used. In some embodiments, the number of continuous lines in a shape may be identified with sharp angle changes signifying a different line allowing shapes to be identified based on the number of lines in each object. For example, three or more lines is identified as a polygon, 1 line is identified as a circle. In other embodiments, shape identity can be further refined based on the angles and lengths of the lines to determine more specific shapes such as squares, triangles, rectangles, rhombuses, or various triangle types. In additional embodiments, shapes may be identified based on pattern recognition. In some embodiments, the user may be presented with options for each object according to degrees of certainty of recognition. The user can then select the correct identification to be applied to the object, may enter the name of a different object, or may edit the shape of the object to appear as desired. In additional embodiments, the user may choose to output the diagram in such a hybrid format with part of the diagram remaining in the hand drawn or static raw image format.

Any text within the raw image may be processed using optical character recognition (OCR). In some embodiments, the processing may include a learning mode to improve its recognition of an individual's handwriting and the shapes they generally draw in a diagram.

Once processed, the digitally generated reproduction of the static raw image may then be manually edited. Portions of the raw image that could not be identified will be correctable by the end user. In some embodiments, the manipulable raw image may be superimposed on the captured raw image, allowing the individual manipulating the raw image to compare the original and the reproduced raw image line by line. In additional embodiments, more complex elements may be brought into the raw image in other formats such as a JPEG, bitmap, TIFF, PNG, or GIFF. The digitally generated reproduction may then be saved in persistent storage. In some embodiments, the finished reproduced raw image may be converted to other useful file formats generally used for displaying information.

The overall processing may include the following relevant actions:
 Prepare the raw image
 Find strings and Polygons
 Adjust Line Lengths Based on Polygon Sizes
 Clean Up strings
 Convert String Segments to Lines
 Find Arrowheads on the Ends of Lines
 Sort Out Chaff from strings
 Detect Probable Text Squares
 Clean up Polygons into Basic Shapes as Appropriate
 Classify Refine Standard Shapes among the Polygons
 Find Connected Shapes
 Prepare the Raw Image This is a preliminary step to remove the background (shading, reflections, etc.) from the drawing. The first step is to remove the background. This is done by 'Prepare the raw image' by the following steps:
 1. Converting an RGB raw image to greyscale and resizing it to a standard size [previously this was done by the application]
 2. Creating a copy (background) of the original raw image and perform a wide-window, median-smoothing of the entire copy.
 3. Subtracting the background raw image from the original raw image. This removes the background from the raw image leaving the greyscale lines.
 4. Calculating a starting threshold based on the rate of change of the number of pixels beneath the threshold.
 5. Adjusting the threshold value to minimize the number of isolated pixels (noise). If the threshold is too low, the number of isolated pixels is high. If the threshold is too high, the number of isolated pixels increases due to eroded lines.
 6. Performing the threshold operation on the enhanced raw image to produce a monochrome raw image of lines and background.
 7. Performing dilation or erosion operations on the raw image to adjust the line thickness to an optimized value.
 Find Strings and Polygons This step is performed to identify polygon shapes from lines in a raw image signal. The raw image is scanned and connected sets of pixels are converted to connected lines. Connected line sets that form closed shapes are identified as polygons and are removed and added to a polygon set, while connected line sets that do not form closed shapes are understood as strings. This is done by 'Find strings and Polygons' by the following steps:
 1. Search for white pixels by scanning the raw image from left to right and bottom to top.
 2. When a white pixel is found,
  a. Search the surrounding pixels to create the longest straight line passing through only white pixels. Mark the pixels close to the line as found.
  b. From the start of the line,
   i. Search the surrounding pixels to create the longest connected straight line passing through only white pixels. Mark the pixels close to the line as found.
   ii. Continue with step (i) until a dead end is reached such as when no more white or found pixels.
   iii. If an intersection is found (two connected lines can be formed) remember the intersection and continue with step (i) in each available direction.
  c. From the end of the line, perform steps b. (i), b. (ii), and b. (iii).
 3. Scan through the strings looking for lines end close to another line. If found, connect them.
 4. Find connected lines that form closed shapes (polygons). Extract the polygons in order of shortest to largest path.
 5. Classify the remaining (not closed) connected lines as strings.
 Adjust the Line Length A parameter is used to determine whether a string is a line or not. This parameter is adjusted using the average polygon size. The assumption is that if the average polygon size is large, lines are large and vice versa. This is done by 'Adjust the Line Length' by the following steps:
 1. Scanning through each poly and calculate the distance between the two farthest vertexes.
 2. Calculating the average of these distances.
 3. Adjust the minimum line length parameter based on the average.
 Clean Up Strings Look for strings that are too short or somewhat short and overlay other strings and move them to the chaff category. This is done by 'Clean up strings' by the following steps:
 1. Scan through the strings.
 2. Calculate the length of each string.
 3. If the string is shorter than a parameter, move it to chaff.
 4. If the string is shorter than another parameter and overlays another string, move it to chaff. This catches strings that are created from residue of the original string and polygon search.
 Convert Straight Strings to Lines Looks at each string and see if it qualifies as a line. This is done by 'Convert Straight strings to Lines' by the following steps:
 1. Scan through the strings
 2. Find the two vertexes of each string that are farthest apart.
 3. Calculate the shortest route between the vertexes.
 4. Create a set of points representing the lines along the shortest route.
 5. Fit a line to the set of points.
 6. If the line is greater than the minimum line length parameter,
  a. Calculate the average error of the points to the line.

b. If the error is less than the minimum line length parameter,
   i. Remove the line segments making up the line from the original string.
   ii. Move all remaining disconnected segments to new strings (for example, this might be arrowheads).
   iii. Define a line from the best-fit parameters.
   iv. Calculate the confidence that this is a line based on the error of the vertexes.
   v. Add the new line to the lines.

Find Arrowheads

For all lines, look for other lines, strings and chaff to see if they form an arrowhead. This is done by 'Find Arrowheads' by the following steps:
1. Scan through the lines.
2. For each end of the line,
   a. Search other lines that might form part of the left or right side of an arrowhead for the line.
   b. Search strings that might form part of the left or right side of an arrowhead for the line.
   c. Search chaff that might form part of the left or right side of an arrowhead for the line.
3. Validate the arrowheads,
   a. Ensure there are two sides to an arrowhead.
   b. Make sure the arrowhead lengths are similar.
   c. Make sure the angles of the arrow sides are similar relative to the line.
4. If the arrowhead is valid, mark the line as having an arrowhead.
5. Remove the lines, strings and chaff that make up the arrowhead.

Find Strings that Qualify as Chaff

For all strings, look for strings that should be chaff. The original strings have been modified by removing polygons, lines. This is done by 'Find strings that Qualify as Chaff' by the following steps:
1. Scan through the strings.
2. Check each string against other strings to see if it is chaff.
   a. Is it isolated from other strings?
   b. Is it short?
3. If it is chaff, remove it from the strings and add it to the chaff Find Probably Text Look for strings, lines and chaff that may be text. This is done by 'Find Probably Text' by the following steps:
1. Assume any strings, lines or chaff that are fully enclosed in a polygon are assumed to be text.
   a. Check each line to see if it is fully-enclosed within a polygon. If so, add it to the text.
   b. Check each chaff to see if it is fully-enclosed within a polygon. If so, add it to the text.
   c. Check each string to see if it is fully-enclosed within a polygon. If so, add it to the text.
2. For each string, examine the bounding rectangle and see if it meets the width and height and width-to-height ratios to be text. If so, add it to text.
3. Look for text rectangles that are in close proximity to each other and combine them as one text object.
4. Scan through the chaff and add any chaff enclosed within a text box to the text for that text box.
5. Add the text and text boxes to the text collection.

Clean Up Polygons into Basic Shapes as Appropriate

Look at each polygon and see if it is close to a basic shape from a triangle to a pentagon. This is done by 'Clean Up Polygons into Basic Shapes as Appropriate' by the following steps:
1. Scan through the polygons
2. Calculate the best fit error of 3-sided (triangle) through 5-sided (pentagon) polygons.
3. Select the shape that has the lowest error.
4. If the error is low enough, replace the polygon vertexes with the best-fit vertexes.

Classify Refine Standard Shapes among the Polygons

Examine each polygon found and see if it is a rectangle, a circle, a triangle, a cloud, or just an n-sided polygon. For each polygon:
1. Check for a 4-sided polygon and classify it,
   a. If it does not have 4 line segments, go to step 2.
   b. Based on which sides are close to parallel, or close to equal length, classify the shape as a:
      i. Rectangle
      ii. Parallelogram
      iii. Trapezoid
      iv. Rhombus
      v. Square
      vi. 4-sided polygon
   c. If any of (i) through (v), adjust the sides of the shape to ideal shapes.
   d. Calculate the confidence level based on the fit error between the original polygon points and the ideal
   e. Save the shape details.
2. Check for a 3-sided polygon and classify it,
   a. If it does not have 3 line segments, go to step 3.
   b. If the distance of a vertex to the opposite side is too short relative to the others, set this to a 3-sided polygon
   c. Based on the lengths of the sides adjust the sides and true up the shape to be either a
      i. Equilateral Triangle
      ii. Isosceles Triangle
      iii. General Triangle
   d. Calculate the confidence level based on the fit error between the original polygon points and the ideal.
   e. Save the shape details.
3. Check if the polygon is a Cloud.
   a. If the polygon has less than a parameter number of vertexes, go to step 4.
   b. Calculate the centroid of the vertexes.
   c. Calculate the distances from each vertex to the centroid.
   d. Start at the closest vertex and find the alternate closest and farthest vertexes.
   e. For each closest-farthest-closest vertexes, calculate how well the vertexes between the two close vertexes fit an ellipse. This fits the "petals" of the cloud.
   f. If the error of the fits is greater than a parameter or the number of petals is less than a parameter, go to step 4.
   g. Calculate the confidence level based on the petal fit error.
   h. Save the shape details.
4. Check for an ellipse or circle.
   a. Fit the points to an ellipse using the Simplex method fitting algorithm.
   b. Determine the average and maximum error of the fit to the fit points. If the average error is less than a tolerance and the maximum error is less than a given tolerance, mark it as an ellipse.
      i. Compare the major and minor axes of the ellipse. If the difference is less than a tolerance,
         1. Fit a circle to the fit points.
         2. Mark the shape as a circle.
      ii. Calculate the confidence based on the fit error.
      iii. If the shape is not a circle, check the angle of the ellipse and if it is close to horizontal/vertical, make it horizontal/vertical.
      iv. If the shape is not a circle or ellipse, mark it as an a polygon
   c. Save the shape details Find Connected Shapes Find lines that appear to connect shapes and mark them with the shape numbers. This is done by 'Find Connected Shapes' by the following steps:

1. For each line, check the end points to see if they are close to the identified shapes.

2. If the shape is close mark the line with that shape number.

Other refinements that may be implemented:

1. Parallax and Tilt—correcting for pictures taken when the camera charge-coupled device (CCD) is not parallel to the whiteboard.

2. Detection and exclusion of areas that are not part of the whiteboard.

3. Use of color to segment shapes—using colors may help identify connected line segments.

DRAWINGS

FIG. 1 illustrates an embodiment of a high level system for raw image acquisition and processing 100. The system comprises client device 104, machine network 110, and server system 102. The client device 104 receives a raw image signal of a print or display graph 108 from the camera 106 and in response processes the raw image to reduce noise, normalize the raw image data and reduce pixel information. The server system 102 receives a processed image from client device 104 and in response operates image processor 112 logic (described later) to transform the processed image into a format in which image lines and other geometric objects are manipulable.

Figure 2:
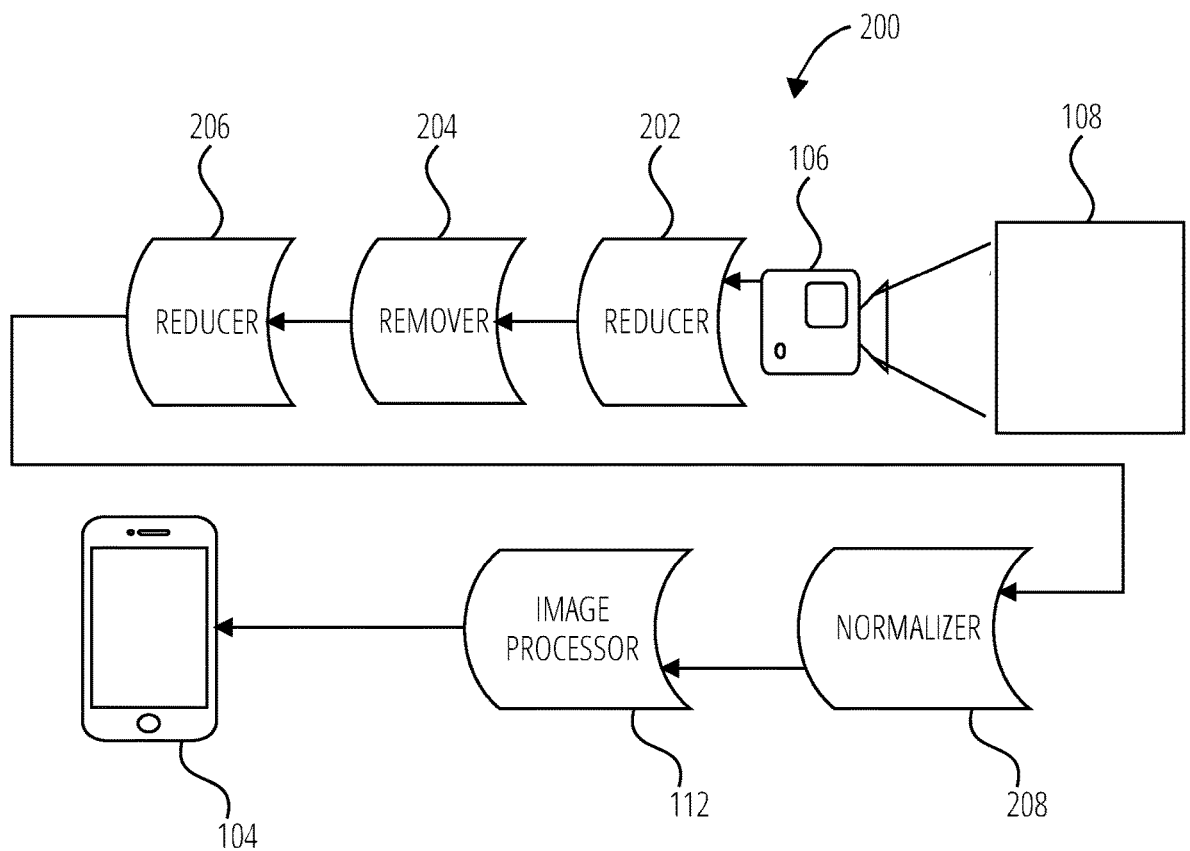
FIG. 2 illustrates an embodiment of an image processing system 200.

FIG. 2 illustrates an embodiment of an image processing system 200. The system comprises camera 106, pixel reducer 204, background remover 206, noise reducer 208, image normalizer 210, image processor 112, and client device 104. The camera 106 captures an RGB (or other color format) image of the print or display graph 108. The pixel reducer 204 receives the captured image from the camera 106 and in response converts the image to greyscale and resizes it to pre-set dimensions. The background remover 206 receives the modified image from the pixel reducer 204 and in response removes the image background, retaining in the image greyscale lines. The noise reducer 208 receives a modified image from the background remover 206 and in response adjusts threshold values to minimize a number of isolated (unconnected) pixel values. The noise reducer image normalizer 210 receives a modified image from the noise reducer 208 and in response performs threshold operations to produce a monochrome image. The image processor 112 receives a modified image from the image normalizer 210 and in response performs processing to convert the image into a format in which image lines and other geometric objects are manipulable. This final format is communicated to the client device 104.

Figure 3:
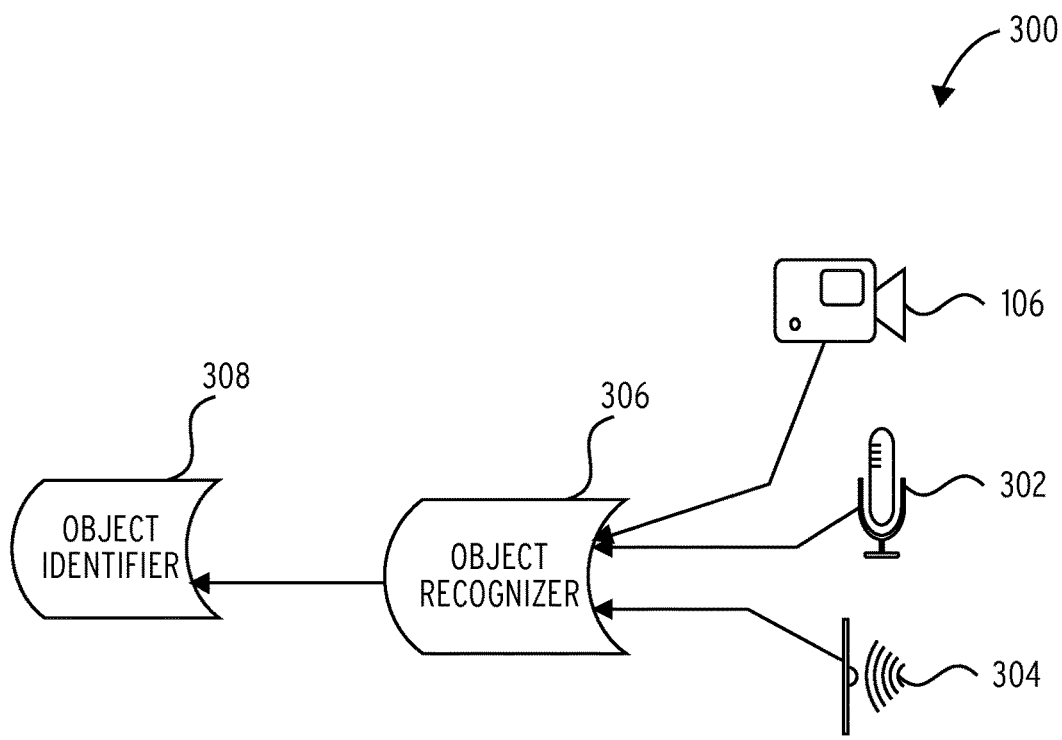
FIG. 3 an embodiment of a raw image processing system 300.

FIG. 3 an embodiment of a raw image processing system 300. The system comprises an object recognizer 302, an object identifier 308, and various sensors and transducers (e.g., camera 106, sensor/transducer (sound) 304, and sensor/transducer (position) 306).

The object recognizer 302 receives a raw image and readings/data from sensors and transducers and in response analyzes the raw image, applying the readings, generating a list of bounding areas that are determined to contain atomic objects to be identified and converted in the raw image. The object identifier 308 receives the object bounds formation from the object recognizer 302 and in response analyzes each object and identifies the type and/or content of the object.

Figure 4:
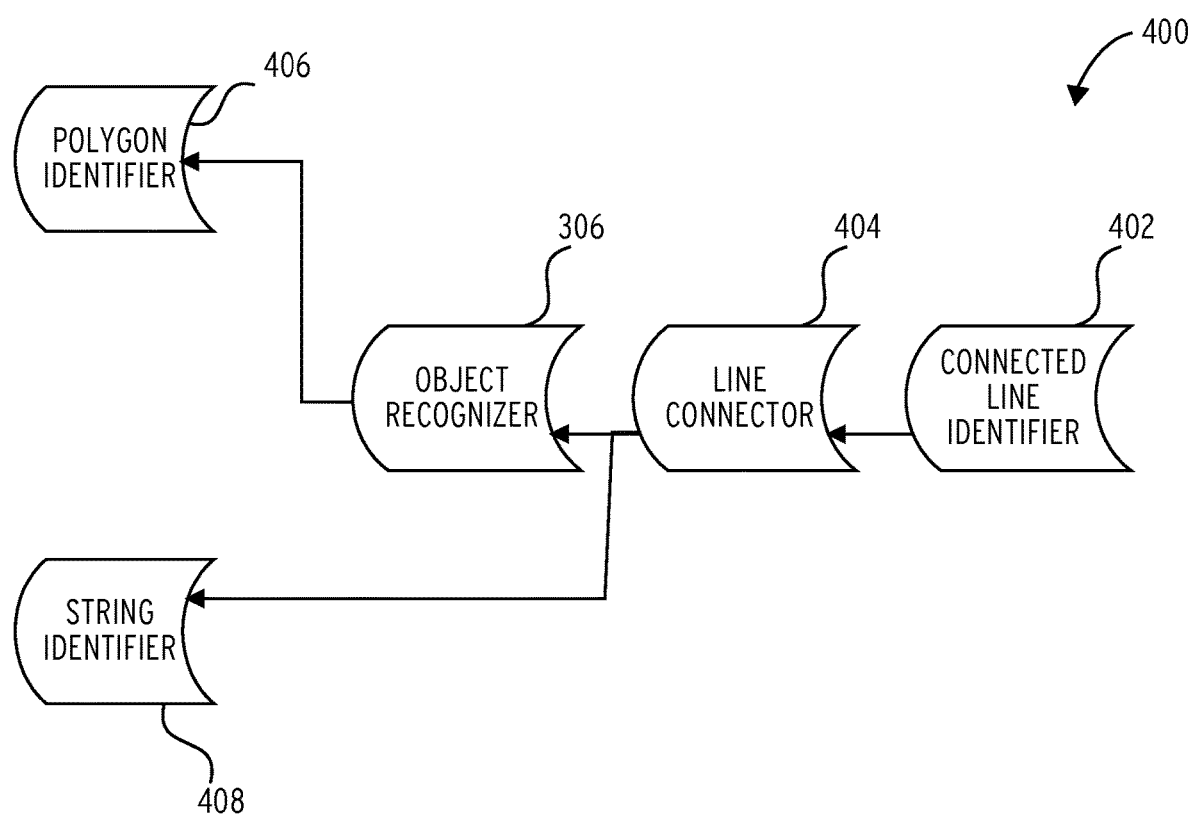
FIG. 4 illustrates an embodiment of an image processor 400.

FIG. 4 illustrates an embodiment of an image processor 400. The image processor 400 (e.g., an embodiment of image processor 112) comprises a connected line identifier 402, a line connector 404, an object recognizer 302, a polygon identifier 406, and a string identifier 408.

A modified image from the image normalizer 210 is received by the connected line identifier 402 which scans the image for connected sets of pixels that are converted to connected lines. The line connector 404 receives lines from the connected line identifier 402 and in response scans for line ends that are proximate to other line ends (within a set radius, for example) and connects them (adds pixels to the image to connect the ends, for example).

The object recognizer 302 receives connected lines from the line connector 404 and in response generates a list of bounding areas (polygon sets). The polygon identifier 406 receives the polygon set from the object recognizer 302 and in response analyzes each polygon object and identifies the type and/or content of the object. The string identifier 408 receives the modified image (including connected lines) from the object recognizer 302 and in response refines the set by identifying lines and removing strings determined to be chaff.

Figure 5:
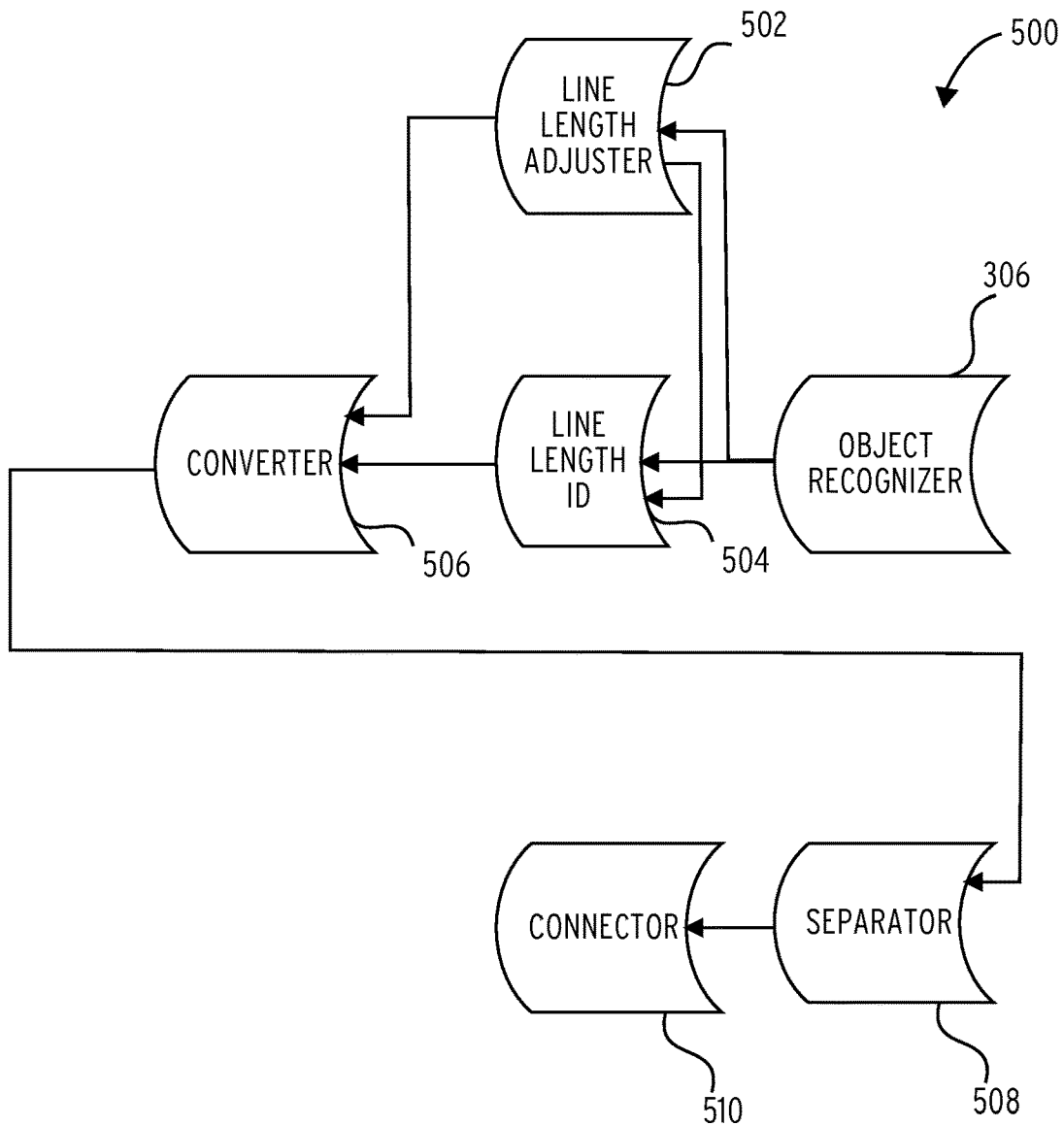
FIG. 5 illustrates additional details 500 of an image processor 400.

FIG. 5 illustrates additional details 500 of an image processor 400. The image processor 400 comprises object recognizer 302, line length identifier 504, line length adjuster 502, straight string converter 506, separator 508, and shape connector 510.

The object recognizer 302 provides polygon sets to the line length adjuster 502 and the line length identifier 504. The line length adjuster 502 determines a minimum line length parameter based on an average polygon size. The line length identifier 504 receives a processed image from the object recognizer 302 and in response scans through strings and calculates the length of each string. The line length identifier 504 receives a line length parameter from the line length adjuster 502 and in response compares the length of each string and compares it to the line length parameter, and moves a string to a chaff set if string is shorter than the parameter and overlays another string.

The straight string converter 506 receives an image from the line length identifier 504 and in response scans through the strings in the image data and calculates the shortest path between furthest apart vertexes of the strings. The straight string converter 506 receives a line length parameter from the line length adjuster 502 and in response compares the shortest path distance to minimum line length parameter if string is a straight line.

The separator 508 receives a string set from the straight string converter 506 and in response ignores modified strings (straight line, polygon, etc) and compares strings against themselves to determine removal as chaff. The shape connector 510 receives a processed image from the separator 508 and in response combines the processed image data comprising modified strings with a processed polygon set to generate a structured drawing.

Figure 6:
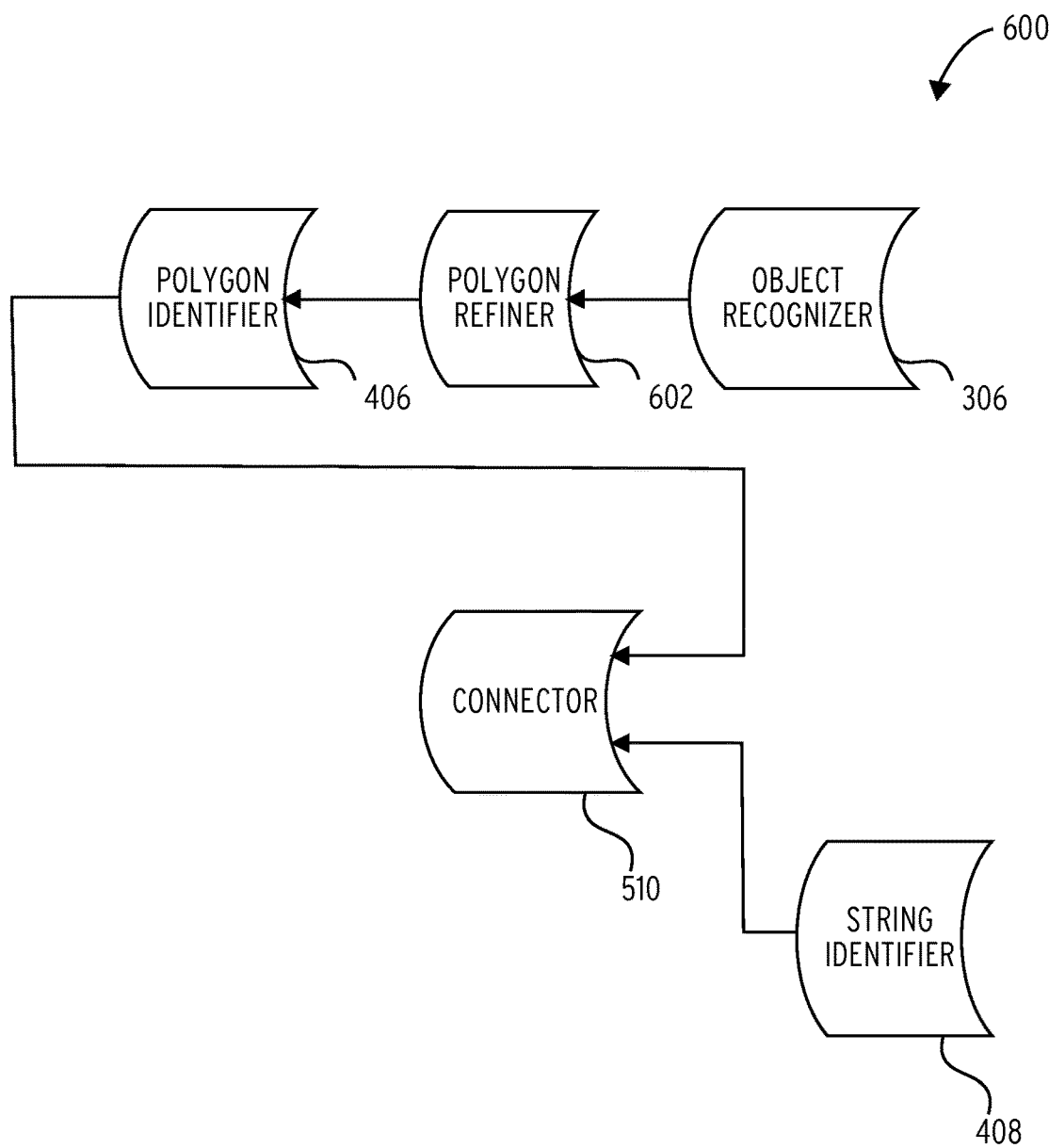
FIG. 6 illustrates an embodiment of an object identification and refinement sub-system 600 of an image processor 400.

FIG. 6 illustrates an embodiment of an object identification and refinement sub-system 600 of an image processor 400. The polygon refiner 602 receives a polygon set signal from the object recognizer 302 and in response analyzes each polygon for similarity to a basic shape from a triangle, quadrilateral, or pentagon set, forming a refined polygon set. The polygon identifier 406 receives a refined polygon set from the polygon refiner 602 and in response examines each polygon in the set for more specific shape typing to a rectangle, a circle, a triangle, a cloud, or just an n-sided polygon. The shape connector 510 receives a processed polygon set from the polygon identifier 406 and in response identifies lines that connect polygons, and tags them with numbers, generating a manipulable image. The 410 also receives a processed image from the string identifier 408 and in response applies the refined polygon set to find lines that connect polygons, and to tag them with numbers and generating a manipulable image.

Figure 7:
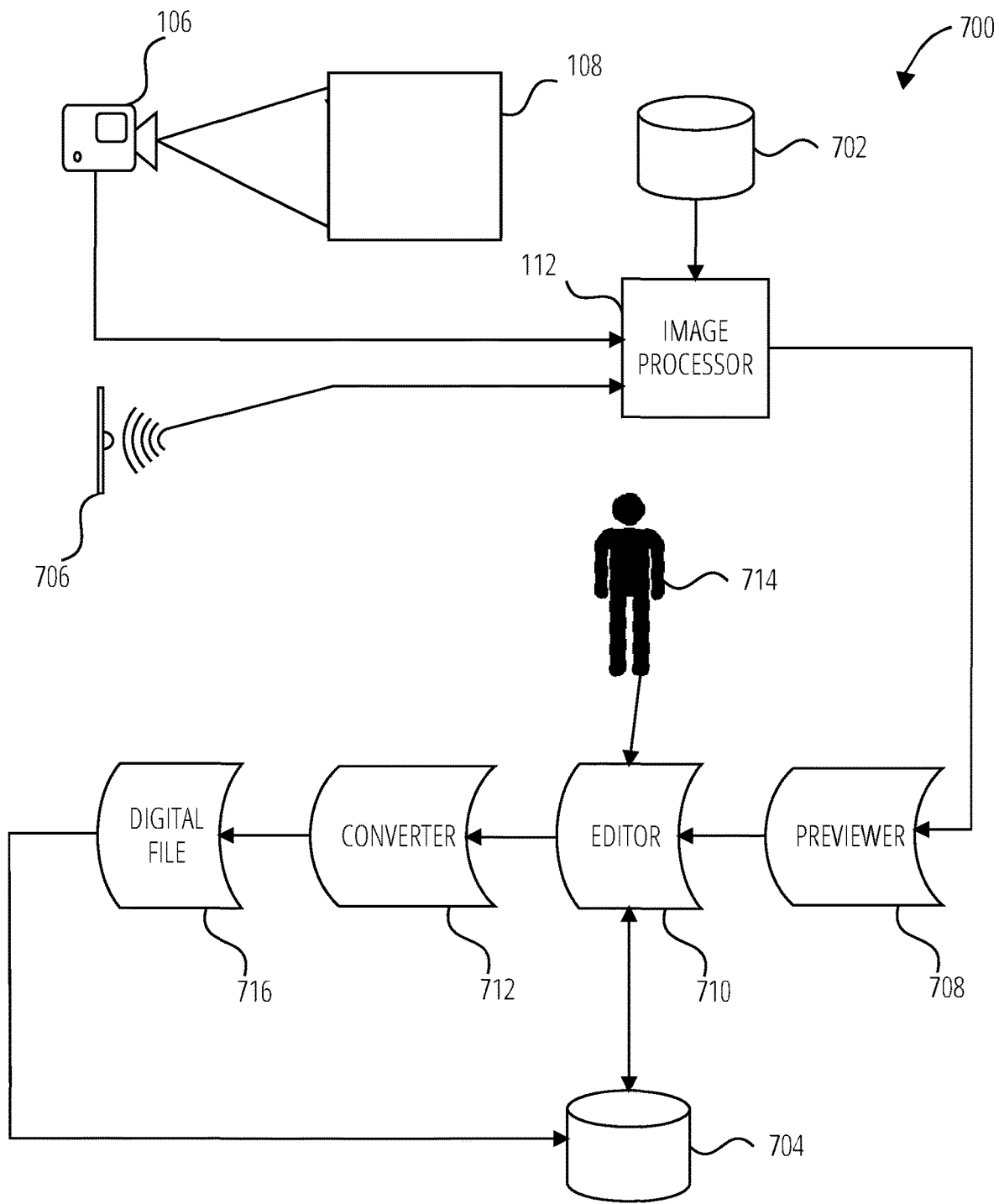
FIG. 7 illustrates an embodiment of a raw image processing system 700.

FIG. 7 illustrates an embodiment of a raw image processing system 700. The raw image processing system 700 converts a print or display graph 108 including geometric object representations into a format in which the geometric objects are parameterized (converted to structured metadata defining the geometry of the objects) in a structured machine data graph. The raw image processing system 700 comprises camera 106, image processor 112, persistent machine storage 702, persistent machine storage 704, location sensor 706, preview application 708, object-oriented drawing editor 710, format converter 712, and digital file 716.

The image processor 112 receives an image from the camera 106 and positional data from the location sensor 706 and in response cross-references the positional data with the raw image to generate structured drawing data. The raw image may be provided to the image processor 112 from persistent machine storage 702.

The preview application 708 receives the structured drawing data from the image processor 112 and in response presents it to the user 714 for preview, allowing the user to continue capturing raw image data in an attempt to obtain more accurate structured data, or accepting the preview and continuing. The object-oriented drawing editor 710 receives structured drawing data from preview application 708 and in response displays it to the user along with editing tools to change the structured drawing data (move objects, connect objects, resize objects, etc.).

The user 714 may operate the object-oriented drawing editor 710 to save the modified data to digital file 716 on the persistent machine storage 704 for later use, potentially converting the structured drawing data to a different file format in the process by engaging the format converter 712.

Figure 8:
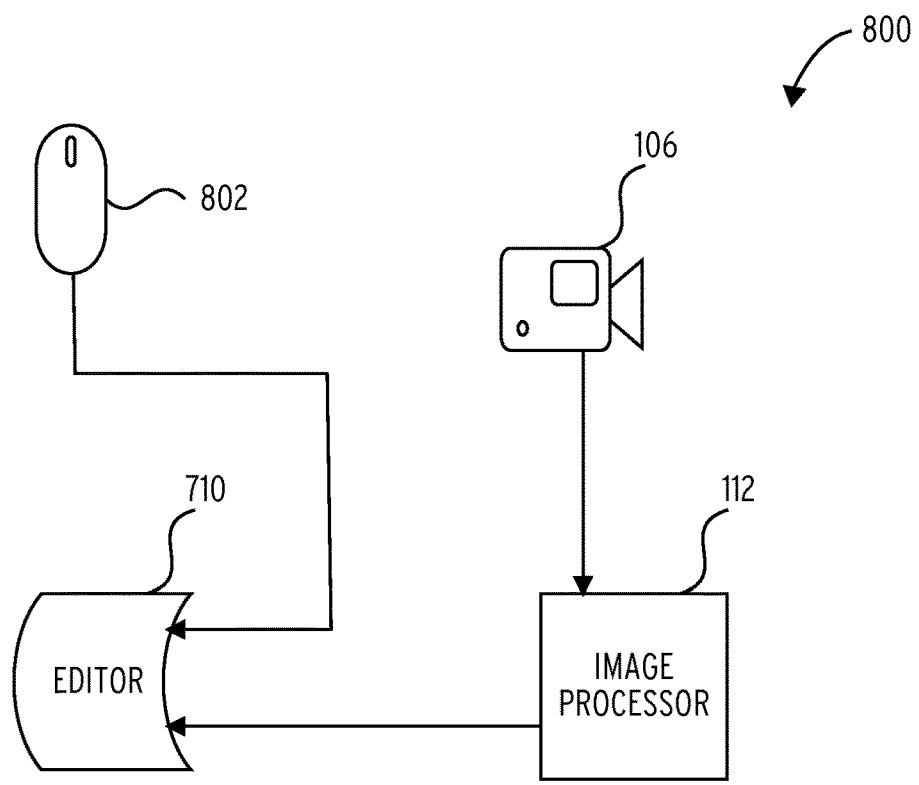
FIG. 8 illustrates an embodiment of a system for creating a hybrid raw image 800.

FIG. 8 illustrates an embodiment of a system for creating a hybrid raw image 800. The system for creating a hybrid raw image 800 comprises camera 106, image processor 112, user input device 802, and object-oriented drawing editor 710.

The image processor 112 receives a raw image from the camera 106 and in response processes the raw image into a manipulable raw image. The object-oriented drawing editor 710 receives a processed (manipulable) raw image signal from the image processor 112 and in response accepts inputs to produce overlay data and manipulations in the raw image. The object-oriented drawing editor 710 receives overlay data from the user input device 802 and in response applies the overlay data (which can include movement, re-sizing, deletions, additions, etc.) to the raw image to produce a compound (hybrid) raw image object in machine memory.

Figure 9:
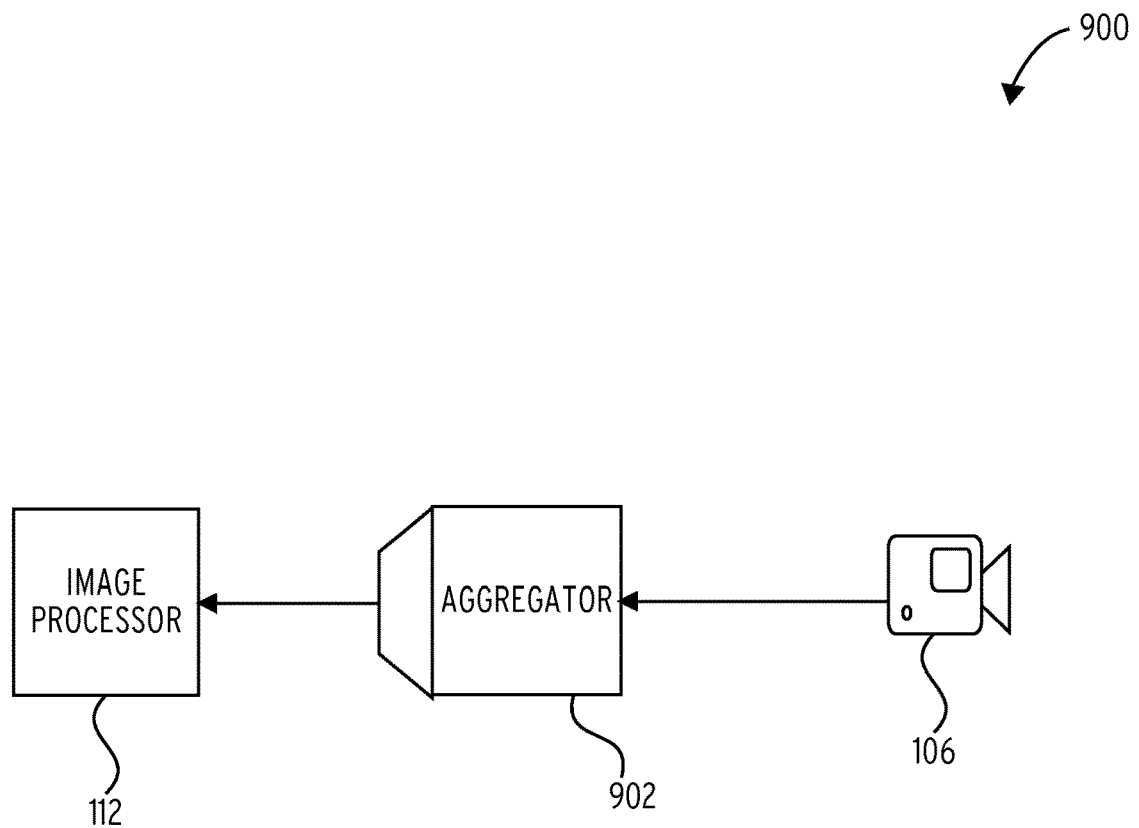
FIG. 9 illustrates an embodiment of a system for the aggregation and processing of multiple raw images 900.
Figure 10:
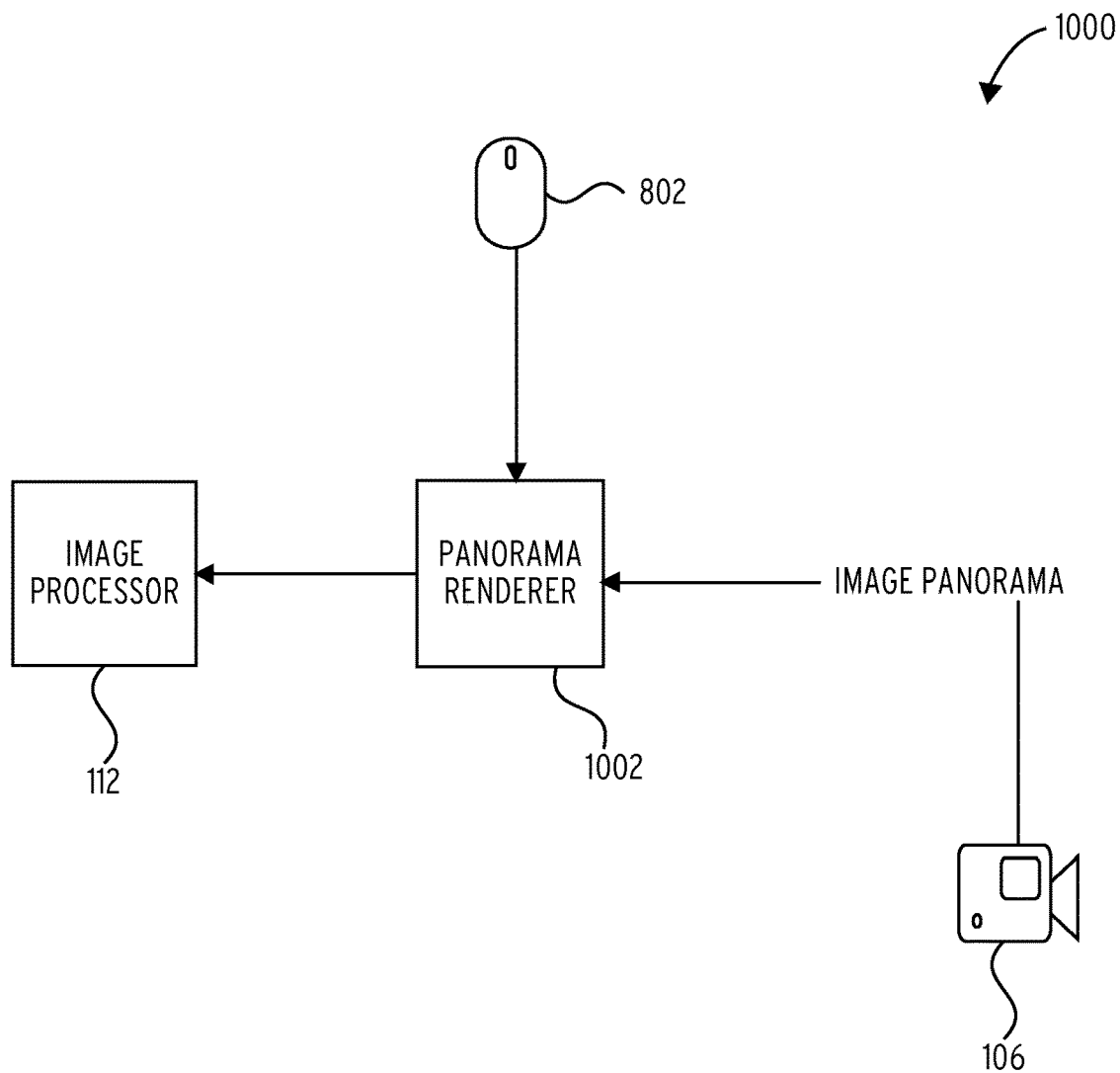
FIG. 10 illustrates an embodiment of a system for the processing image panoramas 1000.

FIG. 9 illustrates an embodiment of a system for the aggregation and processing of multiple raw images 900. The system for the aggregation and processing of multiple raw images 900 comprises camera 106, aggregator 902, and image processor 112.

The system utilizes multiple images, from possibly multiple vantage points/perspectives, to identify objects and interconnections among objects in a print or display graph 108. The aggregator 902 receives and combines multiple raw images and transforms them into an aggregate raw image (using known image combination techniques to enhance resolution and image quality). The image processor 112 receives the aggregated raw image from the aggregator 902 and in response processes the aggregate raw image in the manners already described for a single raw image.

FIG. 9 illustrates an embodiment of a system for the processing image panoramas 1000. The system for the processing image panoramas 1000 comprises a camera 106, panorama renderer 1002, image processor 112, and user input device 802.

The system utilizes a panorama, representing multiple images from multiple vantage points/perspectives stitched together into a single image, to identify objects and interconnections among objects in a print or display graph 108. The panorama renderer 1002 receives an image panorama and renders it for a user to select the best portion(s) to convert into a manipulable set of drawing objects. The image processor 112 receives the aggregated raw image from the panorama renderer 1002 and in response processes the selected raw image portion(s) in the manners already described for a single raw image.

Figure 11:
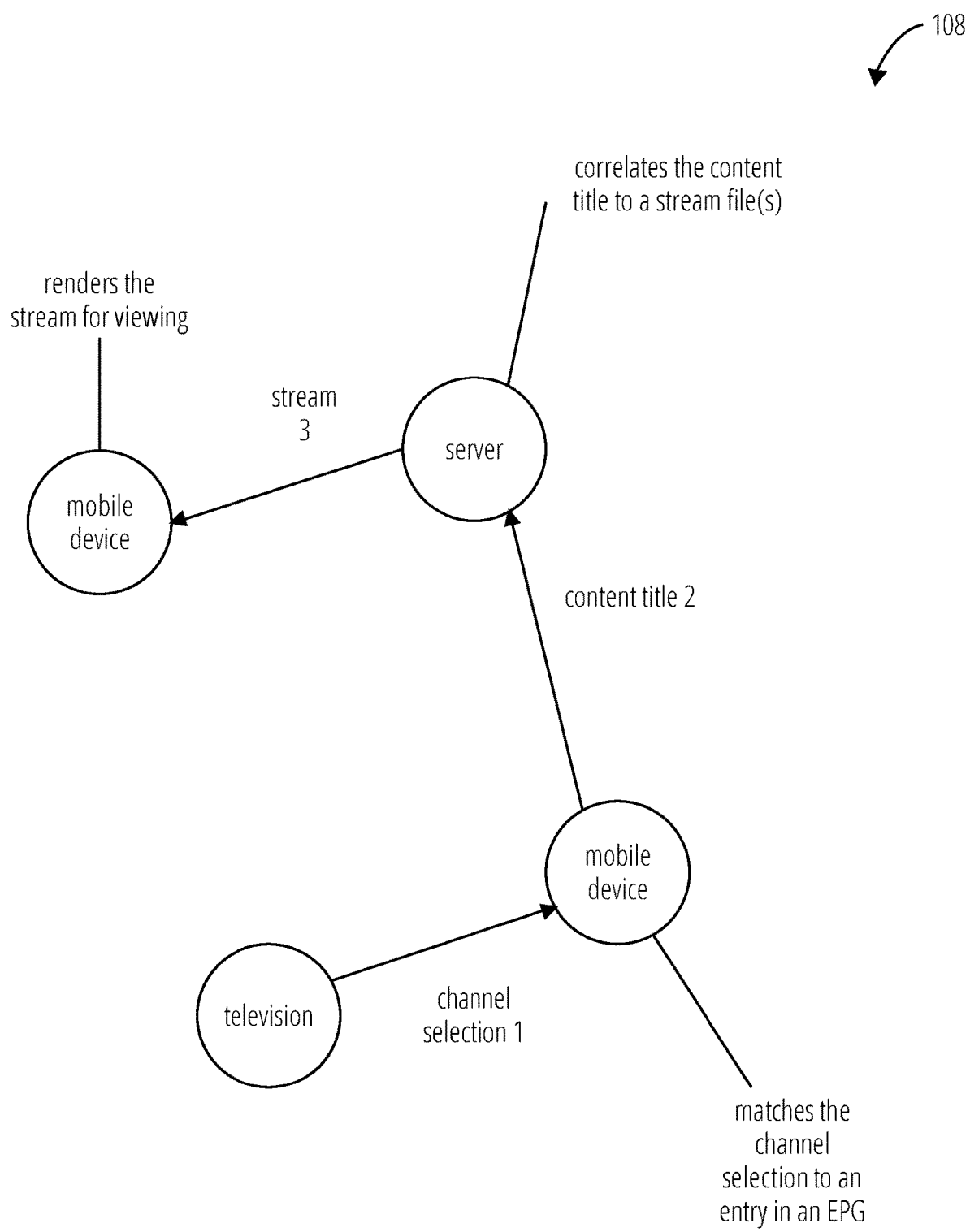
FIG. 11 illustrates an example of a print or display graph 108.

FIG. 11 illustrates an example of a print or display graph 108. The print or display graph 108 may for example be a whiteboard or paper sketch which may be processed into a 'triple' set of computerized illustrations (system diagram, action flow diagram, and flow chart). The sketch includes shapes (e.g., circles) representing components in a machine system. There are lines between the shapes, annotated with text and numbers. There are lead lines with proximate text terminating within the shapes, representing processing/transformations by the components.

Figure 12:
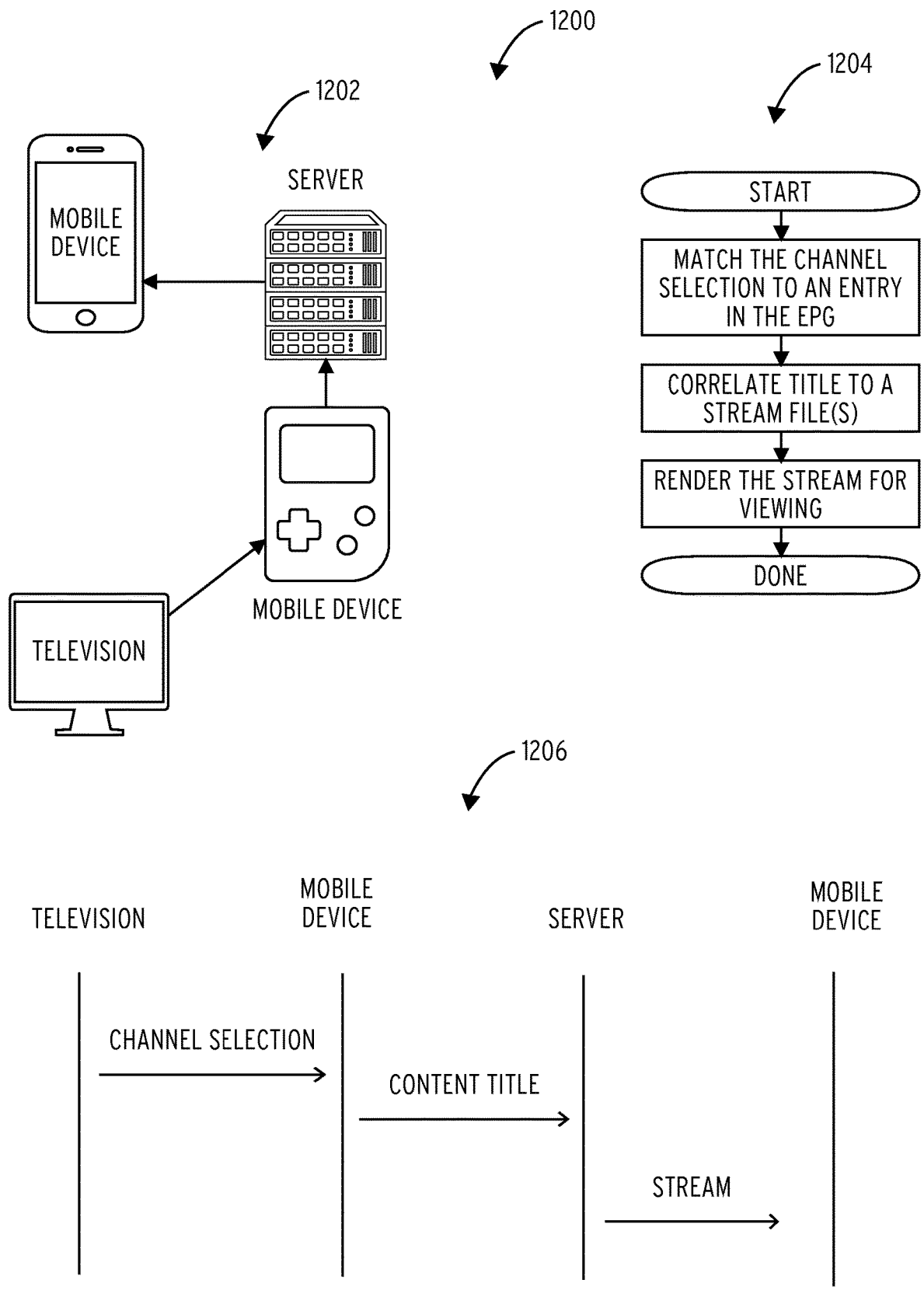
FIG. 12 illustrates an embodiment of an object oriented drawing triple 1200 generated for the print or display graph 108 example illustrated in FIG. 11.

FIG. 12 illustrates an embodiment of an object oriented drawing triple 1200 generated for the print or display graph 108 example illustrated in FIG. 11.

The image processing system 200 is operated to identify shape objects in the print or display graph 108 and communication lines (e.g., arrows) between the shape objects. Text strings associated in the print or display graph 108 with the shape objects (via position and proximity, for example contained by the shape objects) are identified, and graphic stencils having a configured correspondence with the shape objects are selected to represent the corresponding shape objects. The text strings in the print or display graph 108 are then made labels to the stencils, and connector objects (e.g., arrow connector objects) are inserted between the stencils corresponding to the identified communication lines in the print or display graph 108. The result is a connected system (i.e., block) diagram as illustrated for example by system block diagram 1204.

Stem lines (e.g., lines having a floating endpoint proximate with text, and a second endpoint terminating on, in, or near a shape object) are identified and the associated text is made into actions for blocks in a flow chart (flow chart 1206). The top to bottom order for the actions in the flow chart is determined by identifying a sequence number proximate with or otherwise associable with the communication lines in the print or display graph 108.

A data flow diagram (data flow diagram 1202) may also be generated from the print or display graph 108. Vertical lines in the data flow diagram are labeled with the stencil (shape object) labels, and horizontal (communication) lines are labeled with labels identified as associated with communication lines in the print or display graph 108.

The system may auto-generate text to associate with the object oriented drawing triple 1200, by traversing the generated data flow diagram 1202, flow chart 1206, and system block diagram 1204. The traverse text combines the actors (shape labels), actions (stem line labels), and communications (communication line labels) forming the system into a natural language set of one or more sentences. The sentences are ordered according to the sequence numbers associated with the communication lines.

An example of auto-generated traverse text that would be generated and associated with the object oriented drawing triple 1200 is: "The system comprises a television, a first mobile device, a server, and a second mobile device. The first mobile device receives a channel selection signal from the television and in response matches the channel selection to an entry in an EPG. The server receives a content title signal from the first mobile device and in response correlates the content title to a stream file(s). The second mobile device receives a stream signal from the server and in response renders the stream for viewing."

Figure 13:
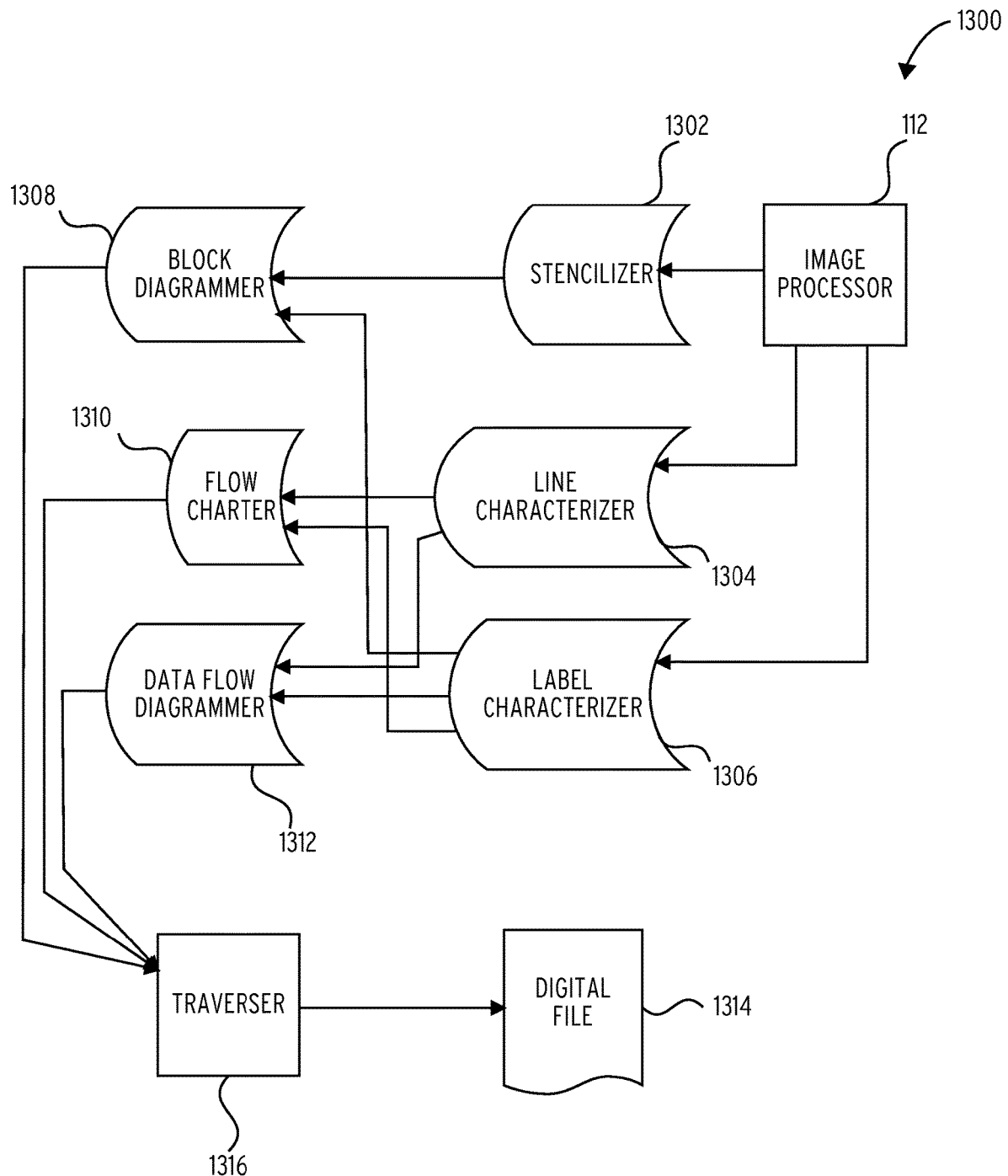
FIG. 13 illustrates an embodiment of a triple diagram generator 1300.

FIG. 13 illustrates an embodiment of a triple diagram generator 1300. The triple diagram generator 1300 comprises image processor 112, stencilizer 1302, block diagrammer 1308, line characterizer 1304, flow charter 1310, label characterizer 1306, data flow diagrammer 1312, digital file 1314, and traverser 1316.

The image processor 112 outputs a set of drawing objects (lines, text strings, and shapes for example) generated by transforming a print or display graph 108. All or subsets of the drawing objects are received by the stencilizer 1302 (which is optional in the triple diagram generator 1300), the line characterizer 1304, and the label characterizer 1306.

The stencilizer 1302 accesses a database (e.g., database 1414) to locate stencils corresponding to drawing objects. The correspondence between stencils and drawing objects may be based upon text strings that the system identifies as being labels for the drawing objects. Thus, the stencilizer 1302 may also act upon an output of the label characterizer 1306.

The line characterizer 1304 analyzes lines that are not part of shapes in the drawing for characteristics indicative of a line type (communication lines, stem lines for example). Lines are tagged (associated with) their characteristic type and other attributes, such as source and destination objects for communication lines, shape object being labeled for object labels, and shape object actor for action stem lines.

The label characterizer 1306 analyzes the text strings in the drawing for characteristics indicative of label types (sequence numbers, object labels, communication line labels, actions for example) and tags the text strings with their characteristic type and possible other attributes (e.g., associated communication line, stem line, or shape object).

Tagged labels and tagged lines are input to the data flow diagrammer 1312, along with drawing objects, and are transformed into the data flow diagram 1202. Those skilled in the art will appreciate how this may be done in a number of ways once the drawing labels and lines are identified and characterized as described herein.

Tagged labels and tagged lines are input to the flow charter 1310, along with drawing objects, and are transformed into the flow chart 1206. Those skilled in the art will appreciate how this may be done in a number of ways once the drawing labels and lines are identified and characterized as described herein.

Tagged labels, stencils, and lines are input to the block diagrammer 1308, along with drawing objects, and are transformed into the system block diagram 1204. Those skilled in the art will appreciate how this may be done in a number of ways once the drawing labels and lines and stencils are identified and characterized as described herein.

The stencilizer 1302 may not be utilized in all embodiments, in which case the shapes from the transformed raw image will be used instead in the system block diagram 1204.

Figure 14:
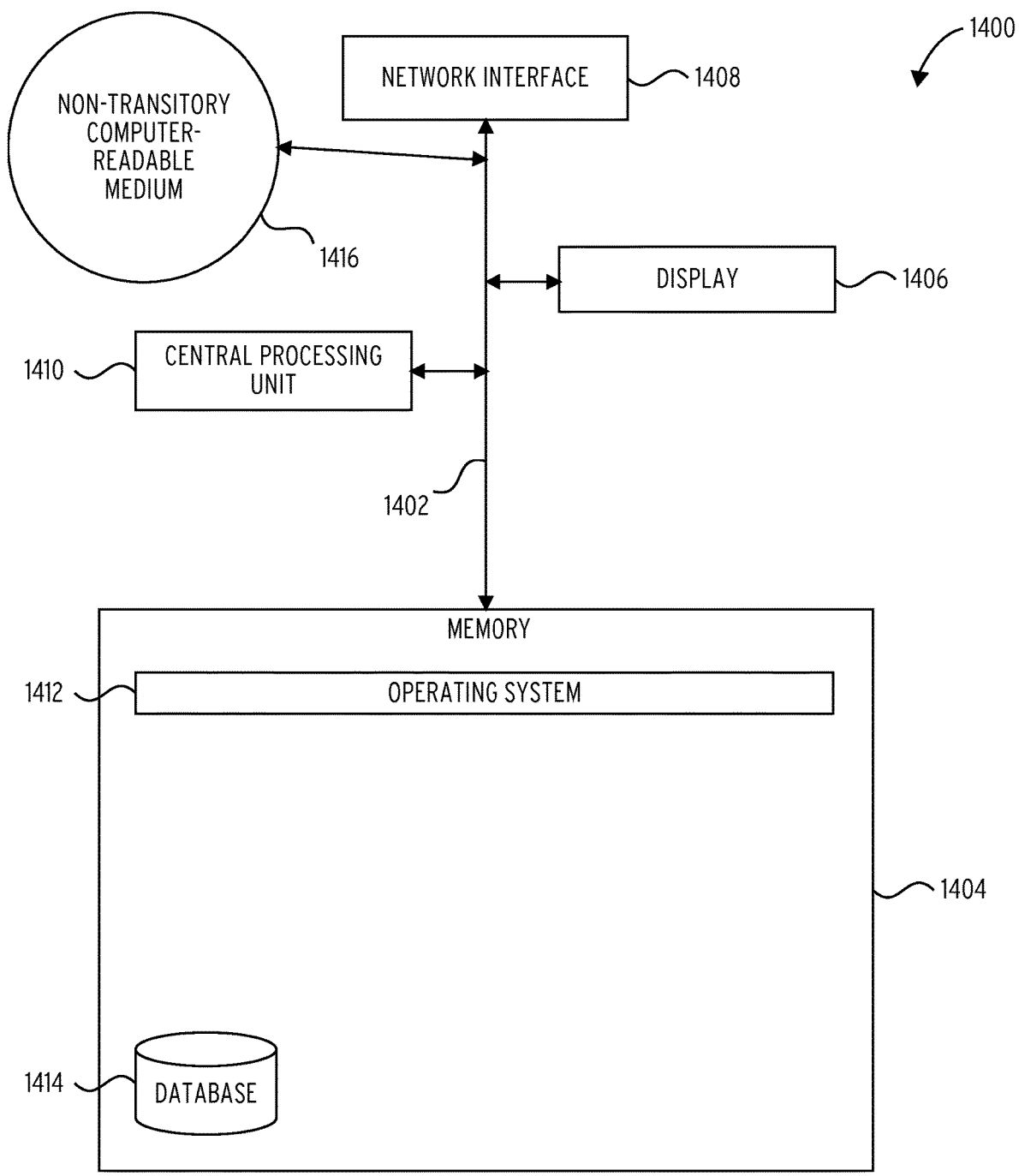
FIG. 14 illustrates a machine system 1400 that may be utilized to implement components of the described image processing systems.

FIG. 14 illustrates a machine system 1400 that may be utilized to implement components of the described image processing systems. For example, the machine system may implement all or portions of the image processor 112.

In various embodiments, machine system 1400 may include a desktop PC, server, workstation, mobile phone, laptop, tablet, set-top box, appliance, or other computing device that is capable of performing operations such as those described herein. In some embodiments, machine system 1400 may include many more components than those shown in FIG. 2. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, machine system 1400 may comprise one or more physical and/or logical devices that collectively provide the functionalities described herein. In some embodiments, machine system 1400 may comprise one or more replicated and/or distributed physical or logical devices.

In some embodiments, machine system 1400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Machine system 1400 includes a bus 1402 interconnecting several components including a network interface 1408, a display 1406, a central processing unit 1410, and a memory 1404.

Memory 1404 generally comprises a random access memory ("RAM") and permanent non-transitory mass storage device, such as a hard disk drive or solid-state drive. Memory 1404 stores an operating system 1412.

These and other software components may be loaded into memory 1404 of machine system 1400 using a drive mechanism (not shown) associated with a non-transitory computer-readable medium 1416, such as a floppy disc, tape, DVD/CD-ROM drive, memory card, or the like.

Memory 1404 also includes database 1414. In some embodiments, server 200 (deleted) may communicate with database 1414 via network interface 1408, a storage area network ("SAN"), a high-speed serial bus, and/or via the other suitable communication technology.

In some embodiments, database 1414 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A diagram generator, comprising:
a line characterizer, wherein the line characterizer analyzes lines that are not part of shape objects in a raw image for characteristics indicative of a line type including at least one of communication lines, object label lines, action stem lines, and combinations thereof, wherein the lines are tagged with their line type characteristics and at least one of source object and destination object for the communication lines, a shape object being labeled for the object label lines, a shape object actor for the action stem lines, and combinations thereof, to form tagged lines;

a label characterizer, wherein the label characterizer analyzes text strings in the drawing for characteristics indicative of a label type and tags the text strings with their label type characteristics and other attributes including at least one selected from an associated communication line, an associated stem line, an associated shape object, and combinations thereof, to form tagged labels;

a block diagrammer, wherein the tagged lines, the tagged labels, and the shape objects, are input to the block diagrammer along with drawing objects, and are transformed into a system block diagram;

a flow charter, wherein the tagged lines and the tagged labels are input to the flow charter along with the drawing objects, and are transformed into a flow chart; and a data flow diagrammer, wherein the tagged lines and the tagged labels are input to the data flow diagrammer along with the drawing objects, and are transformed into a data flow diagram;

an object-oriented drawing editor overlaying bounded objects over the raw image to produce a hybrid raw image object in which the bounded objects are geometric objects that are manipulable from the raw image by the object-oriented drawing editor;

wherein output of the diagram generator comprises at least two of the system block diagram, the flow chart, and the data flow diagram.

2. The diagram generator of claim 1 wherein lines having at least one arrow on at least on end are characterized as a communication line.

3. The diagram generator of claim 1 wherein lines having one end in contact with or proximate to one of the shape objects and another end in contact with or proximate to one of the text strings are characterized as an object label line.

4. The diagram generator of claim 1 wherein the characteristics indicative of label types comprise at least one of numbers, object labels, communication line labels, and action words.

5. The diagram generator of claim 1 wherein the drawing objects comprise a set of graphic stencils stored in persistent machine storage.

6. The diagram generator of claim 1 wherein the diagram generator is configured to further generate text to associate with at least one of the system block diagram, the flow chart, and the data flow diagram based on at least one of the drawing objects, the line type characteristics, and the label type characteristics.

7. A triple diagram generator, comprising:

a line characterizer, wherein the line characterizer analyzes lines that are not part of shape objects in a raw image for characteristics indicative of a line type including at least one of communication lines, object label lines, action stem lines, and combinations thereof, wherein the lines are tagged with their line type characteristics and at least one of source object and destination object for the communication lines, a shape object being labeled for the object label lines, a shape object actor for the action stem lines, and combinations thereof, to form tagged lines;

a label characterizer, wherein the label characterizer analyzes text strings in the drawing for characteristics indicative of a label type and tags the text strings with their label type characteristics and other attributes including at least one selected from an associated communication line, an associated stem line, an associated shape object, and combinations thereof, to form tagged labels;

a block diagrammer, wherein the tagged lines, the tagged labels, and the shape objects, are input to the block diagrammer along with drawing objects, and are transformed into a system block diagram;

a flow charter, wherein the tagged lines and the tagged labels are input to the flow charter along with the drawing objects, and are transformed into a flow chart; and a data flow diagrammer, wherein the tagged lines and the tagged labels are input to the data flow diagrammer along with the drawing objects, and are transformed into a data flow diagram;

an object-oriented drawing editor overlaying bounded objects over the raw image to produce a hybrid raw image object in which the bounded objects are geometric objects that are manipulable from the raw image by the object-oriented drawing editor;

wherein output of the triple diagram generator comprises the system block diagram, the flow chart, and the data flow diagram.

8. The diagram generator of claim 7 wherein lines having at least one arrow on at least on end are characterized as a communication line.

9. The diagram generator of claim 7 wherein lines having one end in contact with or proximate to one of the shape objects and another end in contact with or proximate to one of the text strings are characterized as an object label line.

10. The diagram generator of claim 7 wherein the characteristics indicative of label types comprise at least one of sequence numbers, object labels, communication line labels, and action words.

11. The diagram generator of claim 7 wherein the drawing objects comprise a set of graphic stencils stored in persistent machine storage.

12. The diagram generator of claim 7 wherein the diagram generator is configured to further generate text to associate with at least one of the system block diagram, the flow chart, and the data flow diagram based on at least one of the drawing objects, the line type characteristics, and the label type characteristics.

13. A diagram generator, comprising:

a processor; and a non-transitory machine-readable medium containing instructions that, when executed by the processor, configure the diagram generator:

analyze lines, using a line characterizer, wherein the lines are not part of shape objects in a raw image for characteristics indicative of a line type including at least one of communication lines, object label lines, action stem lines, and combinations thereof, wherein the lines are tagged with their line type characteristics and at least one of source object and destination object for the communication lines, a shape object being labeled for the object label lines, a shape object actor for the action stem lines, and combination thereof, to form tagged lines;

analyze text strings, using a label characterizer, in the drawing for characteristics indicative of a label type and tags the text strings with their label type characteristics and other attributes including at least one selected from an associated communication line, an associated stem line, an associated shape object, and combinations thereof, to form tagged labels;

transform into a system block diagram, using a block diagrammer, the tagged lines, the tagged labels, and the shape objects, that are input to the block diagrammer along with drawing objects;

transform into a flow chart, using a flow charter, the tagged lines and the tagged labels that are input to the flow charter along with the drawing objects; and transform into a data flow diagram, using a data flow diagrammer, the tagged lines and the tagged labels that are input to the data flow diagrammer along with the drawing objects;

overlay, using an object-oriented draw editor, bounded objects over the raw image to produce a hybrid raw image object in which the bounded objects are geometric objects that are manipulable from the raw image by the object-oriented drawing editor, wherein output of the diagram generator comprises at least two of the system bock diagram, the flow chart, and the data flow diagram.

* * * * *